(12) United States Patent
Bastiaans

(10) Patent No.: US 6,723,992 B1
(45) Date of Patent: Apr. 20, 2004

(54) DETECTION ARRANGEMENT PROVIDED WITH OFFSET COMPENSATION

(75) Inventor: Eduard Antonius Bastiaans, Veghel (NL)

(73) Assignee: Thales Nederland B.V., Hengelo (NL)

( * ) Notice: Subject to any disclaimer, the term of this patent is extended or adjusted under 35 U.S.C. 154(b) by 59 days.

(21) Appl. No.: 10/088,526

(22) PCT Filed: Oct. 12, 2000

(86) PCT No.: PCT/EP00/10229
§ 371 (c)(1),
(2), (4) Date: Aug. 7, 2002

(87) PCT Pub. No.: WO01/28233
PCT Pub. Date: Apr. 19, 2001

(30) Foreign Application Priority Data

Oct. 14, 1999 (NL) .............................................. 1013296

(51) Int. Cl.[7] .................................................. G01J 5/02
(52) U.S. Cl. ........................................ 250/350; 250/349
(58) Field of Search ................................. 250/350, 349, 250/338.1, 336.1

(56) References Cited

U.S. PATENT DOCUMENTS 5,838,813 A * 11/1998 Kancler et al. ............. 382/103
6,307,200 B1 * 10/2001 Kuhnly et al. ............ 250/338.1

FOREIGN PATENT DOCUMENTS

| DE | 33 23 956 | 1/1984 | |
|---|---|---|---|
| EP | 0 483 530 | 5/1992 | |
| EP | 601534 A1 * | 6/1994 | ............ H04N/5/33 |
| EP | 647064 A1 * | 4/1995 | ............ H04N/5/33 |
| EP | 0 680 206 | 11/1995 | |
| EP | 0 928 104 | 7/1999 | |
| NL | 1 003 131 | 11/1997 | |
| WO | 86 06214 | 10/1986 | |
| WO | 98 26582 | 6/1998 | |

* cited by examiner

*Primary Examiner*—David Porta
*Assistant Examiner*—Christine Sung
(74) *Attorney, Agent, or Firm*—Oblon, Spivak, McClelland, Maier & Neustadt, P.C.

(57) ABSTRACT

Offset arrangement for an infrared detector array, which continuously adjusts the offset in a recursive process. With the aid of a displacement device the image observed by the detector array is continuously shifted over a small distance, the apparent intensity changes arising for a pixel being used for adjusting the offset.

10 Claims, 3 Drawing Sheets

DETECTION ARRANGEMENT PROVIDED WITH OFFSET COMPENSATION

The invention relates to a detection arrangement for observing infrared radiation emitting or reflecting objects, comprising a two-dimensional array of N×M detector elements $D(i,j)$, $i \leq N$, $j \leq M$, arranged in rows and columns; imaging means, for imaging objects and their environment on the array; image processing means, connected to the array, for periodically generating an image-representing two-dimensional matrix of numbers $S(i,j)$, $i \leq N$, $j \leq M$, and compensation means, for compensating an offset for individual detector elements.

A detection arrangement of this type is known in the art, including compensation means for compensating the offset. There even exists a multiplicity of solutions, each however carrying specific drawbacks.

From EP-A- 0.601.534 compensation means are known in the form of a memory, in which for each detector element the response is set down as a function of incident radiation. The disadvantage of these known compensation means is that insufficient account is taken of the effect of ageing of the detector elements and of the fact that also the temperature of the housing of the detector elements comes into play.

From EP-A- 0.647.064 compensation means are known, which are based on the periodical defocussing of the imaging means. The disadvantage is that at the moment of defocussing the detection arrangement cannot be used for the execution of its proper tasks.

From EP-A- 0.849.941 compensation means are known which utilize the movement of the detection arrangement, resulting in the image on the array moving, too. From the noise that is seemingly added to the image as a result of offset errors, the offset for each detector element can be deduced. Disadvantages of this solution are that it does not work when the detection arrangement is immobile, and that the deduction of the offset requires much calculating effort.

The present detection arrangement has none of these disadvantages and is, according to an aspect of the invention, characterized in that the compensation means comprise a displacement device, positioned between the imaging means and the array and arranged for displacing the image on the array, and filtering means, incorporated in the image processing means, for generating offset compensating values $C(i,j)$ from at least two images with mutually divergent displacements.

A preferred embodiment according to an aspect of the invention is characterized in that the displacement device comprises a rotatably positioned plate that is transparent for infrared radiation. By turning the plate through a previously determined angle, a defined displacement of the image on the array can be effected, after which by comparing the non-displaced image with the displaced image the offset of all detector elements can be established. The displacement of the image may subsequently be cancelled by executing an inverse displacement in the image matrix.

A further preferred embodiment, enabling a number of displacements to be effected in a simple manner, is characterized in that the plate is rotatably positioned around an optical axis, and that at least a front face or a rear face is mounted non-perpendicular to the optical axis.

A further preferred embodiment, enabling virtually any desired displacement to be effected, is characterized in that the plate is rotatably positioned around two axes, the axes being positioned such that they are at least substantially perpendicular to an optical axis of the plate and that they are mutually perpendicular.

According to a further aspect of the invention, an advantageous implementation of this embodiment is characterized in that the axes are positioned at least substantially parallel to the rows and columns of the array. If the image is displaced in one of the two directions, then a simple shift operation within the rows or within the columns of the image matrix suffices for the thus effected displacement to be cancelled. Preferably the displacement is made to cover a distance corresponding to a distance between two detector elements within a row of within a column.

A further preferred embodiment according to an aspect of the invention is characterized in that the compensation means are arranged for periodically displacing, with the aid of the plate, an image on (p,q) detector elements, and for subsequently activating the filtering means. In that case the filtering means are preferably arranged for iteratively generating offset correcting values $C(i,j)$ for detectors $D(i,j)$ according to an equation $$C(i,j)_{new} = C(i,j)_{old} + \alpha(S(i-p,j-q) - S(i,j)), \text{ with } 0 < \alpha < 1.$$

As the offset for a detector element changes only slowly, a preferred embodiment of the invention is characterized in that $0.02 < \alpha < 0.2$. By selecting for $\alpha$ a small value, the filtering process is prevented from adding temporal noise to the image.

A further preferred embodiment, requiring little calculating capacity and causing practically no reduction of the available image surface, is characterized in that $p \in \{-1,0,1\}$ and $q \in \{-1,0,1\}$. In this case, for determining the offset, a detector element is only compared with its nearest neighbours. This is possible because the offset values between adjacent detector elements prove to be virtually uncorrelated.

The invention will now be explained with reference to the following Figures, where:

FIG. 1 schematically represents a detection arrangement according to the invention;

FIG. 2 schematically represents an embodiment of a displacement device featuring a plate provided with a wedge;

FIG. 3 represents a possible movement of a pixel P on four detector elements;

FIG. 4 schematically represents an embodiment of a displacement device featuring a plate provided with four actuators;

Figure 1:
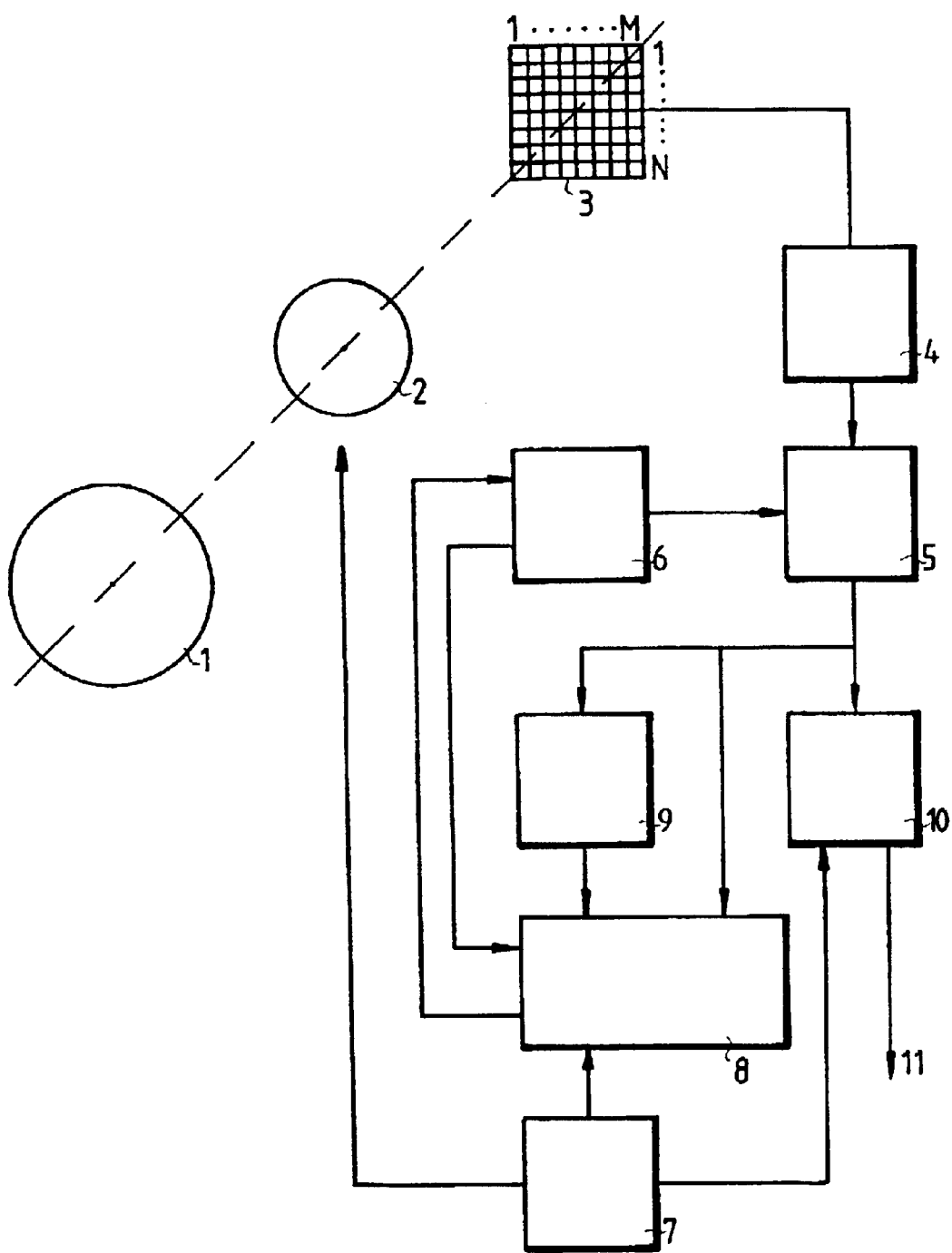

FIG. 1 schematically represents a detection arrangement according to the invention, with infrared radiation via a lens 1 and a plate 2 falling on an N by M dimensional array 3 of detector elements $D(i,j)$. Lens 1 and plate 2 are made from a material that is transparent for infrared radiation with a wavelength of, for example 3–10 microns, for example germanium, and they are provided with an anti-reflection coating known in the art. An output voltage of the detector elements $D(i,j)$ is measured periodically, for example at 50 Hertz, by A/D converter 4, and passed on for further processing in the form of N×M digital values. The further processing takes place in gain/offset control circuit 5, in which gain differences and offset differences between the various detector elements $D(i,j)$ are compensated. For the gain differences a correction value per detector element is established once and stored in a gain correction table incorporated in the gain/offset control circuit 5. For the offset differences an offset correction table is provided, which is stored in an offset memory 6, but this table must be adapted continually, because it is dependent on the temperature of the observed object and its environment, and on the temperature of the detection arrangement. Besides, ageing and marginal changes in supply voltages may affect the offset.

For the adaptation of the offset correction table according to the invention, a plate 2 is provided which, driven by a timing module 7, can displace the image on detector array 3. By comparing, in a filter 8, an image obtained before the displacement and stored in an image memory 9, with an image obtained after the displacement, a new, more accurate offset correction table is created. The displaced image is shifted back into a displacement correction module 10, so that the displacement is invisible in the presented image 11. Timing module 7 informs filter 8 also of the current displacement occasioned by plate 2, in the form of a distance (p,q), where p represents the displacement as a number of pixels in a row, and q represents the displacement as a number of pixels in a column.

Following a displacement of the image over a distance (p,q), the new offset correction table is generated in a recursive filtering process according to the formula:

$$C(i,j)_{new} = C(i,j)_{old} + \alpha(S(i-p, j-q) - S(i,j)), \text{ with } 0 < \alpha < 1$$

where c(i,j) represents a correction value for the detector element D(i,j) and S(i−p,j−q) and S(i,j) are the output voltages of two detector elements which the displacement has caused to be mutually connected. The factor α determines the speed with which the filtering process will be running in. A preferred value, which adds little noise to the image is α=0.1.

Figure 2:
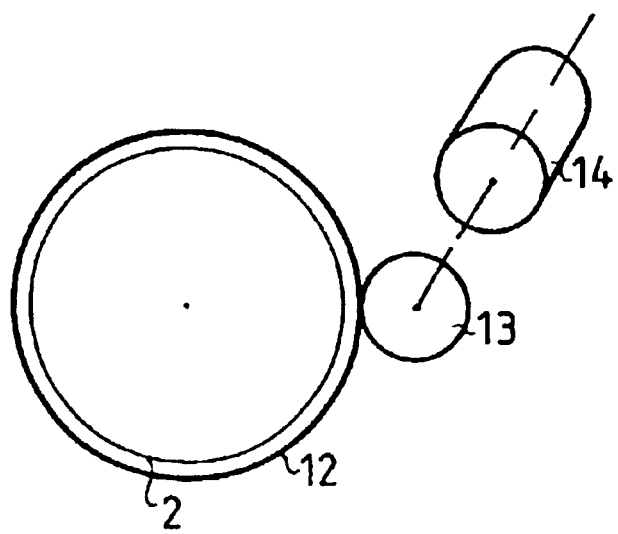

Plate 2 can cause a displacement in a variety of ways. In a first embodiment, schematically shown in FIG. 2, plate 2 is furnished with a wedge between the front face and the rear face, or plate 2 is plane-parallel but not perpendicular to the optical axis. In both cases a rotation of plate 2 around the optical axis will cause a random pixel to trace a circle on the array of detector elements. To enable it to be rotated, plate 2 is integrated in a toothed ring 12, which can cooperate with a gear wheel 13, which in turn can be driven by a motor 14.

Figure 3:
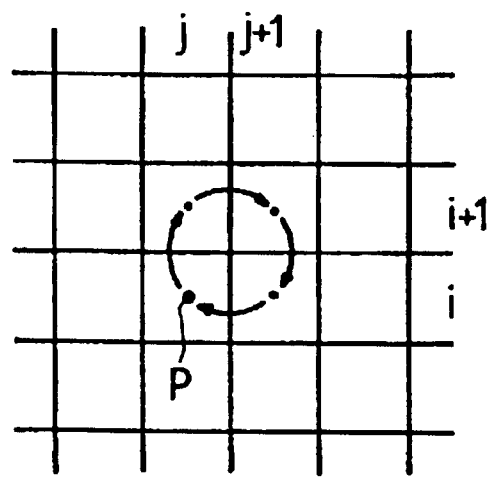

FIG. 3 shows a possible movement of a pixel P on four detector elements in the sequence (i,j), (i+1,j), (i+1,j+1), (i,j+1), a movement that is very suitable for the envisaged correction and is yet so small as to make an offset correction in the image actually superfluous. Further, filter 8 can simply derive the current. displacement from the rotational position of plate 2, for example with the aid of an angle transmitter (not shown).

Figure 4:
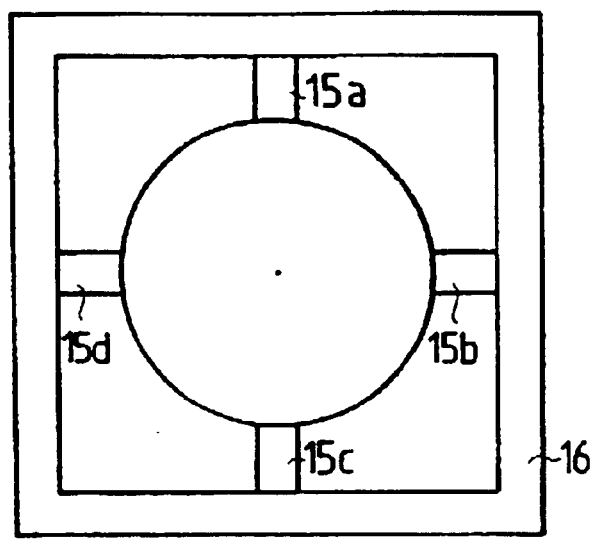

In a second embodiment, plate 2 is furnished with four actuators, as shown in FIG. 4. In the embodiment shown, plate 2 is attached via piezo-electric actuators 15a, 15b, 15c, 15d to a frame 16. The four actuators (known in the art) are plate-shaped and of a type that bends away from the drawing plane when a direct current is applied. By applying, for example, identical but mutually opposite direct currents to actuators 15a and 15c, plate 2 is caused to rotate around an imaginary axis through actuators 15b and 15d, which will cause a pixel to be displaced in the vertical sense. By alternatively driving actuators 15b and 15d, a horizontal displacement can be occasioned in a comparable manner.

Figure 5:
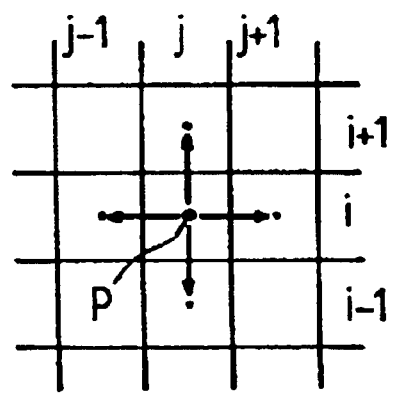
FIG. 5 represents a possible movement of a pixel P on five detector elements.

FIG. 5 shows a possible movement of a pixel P on five detector elements (i,j), (i+1,j), (i−1,j), (i,j+1), (i,j−1), a movement that is also very suitable for the envisaged correction and is yet so small as to make an offset correction in the image actually superfluous. The movements may, for example, be performed randomly. Actuators 15a, 15b, 15c, 15d are now directly driven by timing module 7, which can therefore also inform filter 8 on the current position of plate 2.

Figure 6:
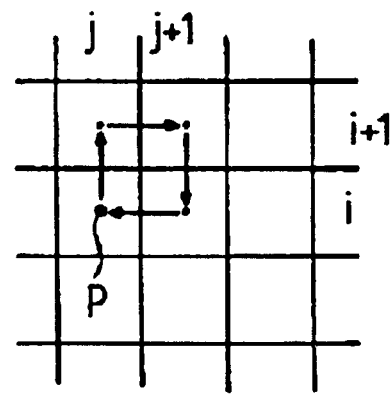
FIG. 6 represents an alternative possible movement of a pixel P on four detector elements.

FIG. 6 shows an alternative possible movement of a pixel P on four detector elements (i,j), (i+1,j), (i+1,j+1), (i,j+1), a movement which is effectively similar to the movement shown in FIG. 3. The difference is that the movement is now realised by driving actuators 15a, 15b, 15c, 15d.

What is claimed is:

1. Detection arrangement for observing infrared radiation emitting or reflecting objects, comprising a two-dimensional array of N×M detector elements D(i,j), i≦N, j≦M, arranged in rows and columns; imaging means, for imaging objects and their environment on the array; image processing means, connected to the array, for periodically generating an image-representing two-dimensional matrix of numbers S(i, j), i≦N, j≦M, and compensation means, for compensating an offset for individual detector elements, characterized in that the compensation means comprise a displacement device, positioned between the imaging means and the array and arranged for displacing the image on the array, and filtering means, incorporated in the image processing means, for generating offset compensating values C(i,j) from at least two images with mutually divergent displacements.

2. Detection arrangement according to claim 1, characterized in that the displacement device comprises a rotatably positioned plate that is transparent for infrared radiation.

3. Detection arrangement according to claim 2, characterized in that the plate is rotatably positioned around an optical axis, and that at least a front face or a rear face is mounted non-perpendicular to the optical axis.

4. Detection arrangement according to claim 2, characterized in that the plate is rotatably positioned around two axes, the axes being positioned such that they are at least substantially perpendicular to an optical axis of the plate and that they are mutually perpendicular.

5. Detection arrangement according to claim 4, characterized in that the axes are positioned at least substantially parallel to the rows and columns of the array.

6. Detection arrangement according to claim 5, characterized in that actuators are provided, for displacing an image over a distance corresponding with a distance between two detector elements within a row or within a column.

7. Detection arrangement according to claim 6, characterized in that the compensation means are arranged for periodically displacing, with the aid of the plate, an image on (p,q) detector elements, and for subsequently activating the filtering means.

8. Detection arrangement according to claim 7, characterized in that the filtering means are arranged for the iterative generation of offset correcting values c(i,j) for detectors D(i,j) according to an equation $$C(i,j)_{new} = C(i,j)_{old} + \alpha(S(i-p, j-q) - S(i,j)), \text{ with } 0 < \alpha < 1.$$

9. Detection arrangement according to claim 8, characterized in that 0.02<α<0.2.

10. Detection arrangement according to claim 8, characterized in that p ∈{−1,0,1} and q ∈{−1,0,1 }.

* * * * *